United States Patent [19]

Maj et al.

[11] Patent Number: 5,310,860
[45] Date of Patent: May 10, 1994

[54] PROCESS FOR THE PREPARATION OF POLYAMIDES WITH OLIGOMER FORMATION

[75] Inventors: Philippe Maj, Bad Honnes, Fed. Rep. of Germany; Jean-Marc Sage, Serquigny, France; Philippe Blondel, Bernay, France; Didier Judas, Paris, France; Didier Judas, Paris, France

[73] Assignee: Elf Atochem, S. A., France

[21] Appl. No.: 999,484

[22] Filed: Dec. 30, 1992

[30] Foreign Application Priority Data

Dec. 31, 1991 [FR] France ................................ 91 16404

[51] Int. Cl.$^5$ .............................................. C08G 69/16
[52] U.S. Cl. ...................... 528/324; 528/329.1; 528/330; 528/331; 528/338; 528/339; 528/340; 528/346; 528/347
[58] Field of Search ............... 528/324, 329.1, 330, 528/331, 338, 339, 340, 346, 347

[56] References Cited

U.S. PATENT DOCUMENTS

| | | | |
|---|---|---|---|
| 3,787,373 | 1/1974 | Ridgway et al. | 528/324 |
| 3,926,924 | 12/1975 | Edgar et al. | 528/324 |
| 4,465,821 | 8/1984 | Nielinger et al. | 528/324 |
| 4,826,955 | 5/1989 | Akkapeddi et al. | 528/324 |
| 4,898,896 | 2/1990 | Maj et al. | 528/324 |
| 5,039,786 | 8/1991 | Pipper et al. | 528/324 |

FOREIGN PATENT DOCUMENTS 0458470 11/1991 European Pat. Off. .

*Primary Examiner*—Harold D. Anderson
*Attorney, Agent, or Firm*—John L. Sigalos

[57] ABSTRACT

A process for the manufacture of polyamides consisting essentially of the stages of:

(i) reacting 10 to 90% by weight of the aliphatic and/or cycloaliphatic and/or aromatic-aliphatic diamines (c) with a lactam and/or corresponding amino acid (a) or the substantially stoichiometric combination of one or more aliphatic diamine(s) and of one or more dicarboxylic aliphatic acid(s) and with the aromatic diacid (b); and (ii) reacting the remainder of the aliphatic and/or cycloaliphatic and/or aromatic-aliphatic diamine (c) with the oligomer produced in stage (i) in one or more substages.

19 Claims, No Drawings

PROCESS FOR THE PREPARATION OF POLYAMIDES WITH OLIGOMER FORMATION

The present invention relates to a new process for the preparation of polyamides containing lactam or corresponding amino acid units or the stoichiometric combination of one or more diamines with one or more dicarboxylic diacids, of aromatic diacid units and of aliphatic, cycloaliphatic or aromatic-aliphatic diamine units.

FR-2,324,672 describes a process for polycondensation under pressure of a cycloaliphatic diamine, of iso- and terephthalic acids and of lactam or corresponding amino acid, resulting in transparent polyamides. Similarly, the cycloaliphatic diamine may be replaced by an aliphatic diamine, for example hexamethylenediamine. This one-stage process with the introduction of all the reactants ("one pot") presents a number of disadvantages. In particular, since all of the diamine is introduced at the initial moment, it undergoes a degradation presumably as a result of a deamination reaction producing triamines and also a crosslinking, and this affects negatively the reactor draining ratio, that is to say the quantity of polymer recovered. In addition, this process does not make it possible to introduce large quantities of aromatic diacid such as terephthalic acid. This process also requires long reaction times and the residual lactam content is considerable.

EP-A-0,313,436 describes a process for the preparation of polyamides comprising two stages ("two pot" process). In a first stage a reactor is charged with terephthalic and/or isophthalic acid and the lactam or the corresponding amino acid and then, in a second stage, the diamine is reacted with the diacidic prepolymer formed in the first stage. This process mitigates some disadvantages of the processes traditionally employed hitherto, for example that described in FR 2,324,672, but also presents disadvantages. In fact, the residual acid content after the first stage is considerable and the acid accumulates, for example on the walls of the reactor, and therefore gives rise to problems in conducting the process which are due to the change in the proportions in the reactor.

JP-48/036,957 describes a synthesis process in which one of the diacid or diamine components is introduced in an excess of 1 to 10 mol % during the first stage of polymerization. Nevertheless, the process applies only to polyamides consisting chiefly of two units, such as nylons, and not to the polyamides investigated in the present invention.

There is therefore a need for a process which should be rapid, which should offer a high draining ratio and which should be capable of being implemented for the synthesis of any polyamide, whatever the starting materials and their proportion.

Surprisingly, the Applicant Company has found that these objectives are achieved with the process according to the present invention.

Thus, the subject of the present invention is a process for the manufacture of polyamides consisting of the following units:

(a) lactam(s) and/or corresponding amino acid(s) or the substantially stoichiometric combination of one or more aliphatic diamine(s) and of one or more dicarboxylic aliphatic acid(s), (b) aromatic diacid(s) HOOC-Ar-COOH, where Ar is a divalent aromatic radical, (c) cycloaliphatic and/or aliphatic and/or aromatic-aliphatic diamine(s), comprising the stages of:

(i) reaction of 10 to 90% by weight of the aliphatic and/or cycloaliphatic and/or aromatic-aliphatic diamine units (c) with the lactam and/or corresponding amino acid units (a) or the substantially stoichiometric combination of one or more aliphatic diamine(s) and of one or more dicarboxylic aliphatic acid(s) and with the aromatic diacid units (b); and (ii) reaction of the remainder of the aliphatic and/or cycloaliphatic and/or aromatic-aliphatic diamine units (c) with the oligomer produced in stage (i) in one or more substages.

The term "lactam(s)" as employed in the present description denotes lactams containing more than 5 carbon atoms, preferably from 6 to 12 carbon atoms. Mixtures of lactams are also envisaged in the present invention. The preferred lactams are (E-caprolactam, undecanelactam and lauryllactam (or lactam 12), denoted L12 hereinafter and resulting in the unit 12.

The term "corresponding amino acid" as employed in the present description denotes the $\omega$-aminoacids containing as many carbon atoms as the corresponding lactam. In fact, these $\omega$-aminoacids can be considered as lactams in which the ring is opened at the peptide bond. The $\omega$-aminoacids contain more than 5 carbon atoms, preferably from 6 to 12. Mixtures of $\omega$-aminoacids are also envisaged in the present invention. The preferred $\omega$-aminoacids are 6-aminohexanoic acid, 11-aminoundecanoic acid and 12-aminododecanoic acid, resulting in the units 6, 11 and 12 respectively. Mixtures of lactam and amino acid are also envisaged.

The term "substantially stoichiometric combination of one or more diamines with one or more acids" denotes a mixture or a salt of the diamine and diacid components in a substantially 1/1 ratio, that is to say between 1/1.1 and 1.1/1 inclusive.

The term "aliphatic diamine" as employed in the present invention denotes an $\alpha,\omega$-diamine containing at least 4 carbon atoms, preferably 6 to 12, between the end amino groups. The carbon chain is linear (polymethylenediamine) or branched. Mixtures of aliphatic diamines are also envisaged in the present invention. Preferred aliphatic diamines are hexamethylenediamine (HMDA), 2,2,4- and/or 2,4,4-trimethylhexamethylenediamine, nonamethylenediamine and dodecamethylenediamine. The term "dicarboxylic aliphatic acid(s)" as employed in the present invention denotes the $\alpha,\omega$-dicarboxylic acids containing at least 2 carbon atoms (not including the carbon atoms of the carboxylic group), preferably 4 to 12, in the linear or branched carbon chain mixtures of these diacids are also envisaged in the present invention. The preferred dicarboxylic acids are adipic acid, azelaic acid, sebacic acid and 1,10-decanedicarboxylic acid. Thus, the term "substantially stoichiometric combination of one or more aliphatic diamine(s) and of one or more aliphatic diacid(s)" may denote the 6,6 or 6,12 unit, for example, using the notation commonly employed in the case of polyamides.

The term "aromatic diacid" as employed in the present invention denotes the diacids of formula HOOC-Ar-COOH where Ar is a divalent aromatic radical. This term "divalent aromatic radical" denotes an aromatic ring or two or more aromatic rings linked by an alkyl group. This radical may be substituted according to any configuration, for example ortho, meta or para in the case of phenyl. Mixtures of aromatic diacids are also envisaged in the present description. The preferred aromatic diacids are terephthalic, isophthalic and 2,6-naphthalenedicarboxylic acids, 4,41-dicarboxydiphenyl ether and 4,41-dicarboxybisphenyl-A. The aromatic diacid is advantageously terephthalic and/or isophthalic acid, which are industrially available in large quantities. This term "aromatic diacid" also covers an optional replacement of part of the aromatic diacid by another diacid capable of resulting in a polyamide. Preferably, up to 15 mol % of aromatic diacid can be replaced by one or more α,ω-diacid(s) such as those referred to above in the case of the compound a. Such acids are, for example, adipic, azelaic, sebacic and decanedicarboxylic acids and their substituted homologues.

The term "cycloaliphatic diamine", as employed in the present description denotes an amine of formula:

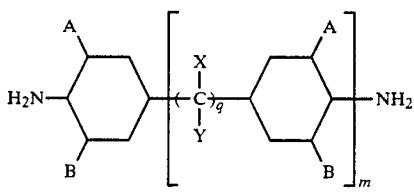

in which:

A and B, which are identical or different, denote hydrogen, the methyl radical, the ethyl radical or the isopropyl radical;

X and Y, which are identical or different, denote hydrogen or the methyl radical;

q is an integer between 0 and 6 inclusive, preferably between 1 and 3;

m has the value 0 or 1.

Mixtures of cycloaliphatic diamines are also envisaged in the present invention.

This term "cycloaliphatic diamine" also covers, within the meaning of the present invention, the diamines containing a cycloaliphatic structure as defined by the above formula in their carbon chain. Isophoronediamine and 3,6-diaminomethyltricyclodecane may be mentioned by way of example. The cycloaliphatic diamine is preferably chosen from the group consisting of: isophoronediamine, bis(4-aminocyclohexyl)methane (BACM), bis(3-methyl-4-aminocyclohexyl)methane (BMACM), bis(3-methyl-4amino-5-ethylcyclohexyl)methane, 1,2bis(4-aminocyclohexyl)ethane, 2,21-bis(4-aminocyclohexyl)propane and 2,21-bis(3-methyl-4-aminocyclohexyl)propane.

The term 'aromatic-aliphatic diamine(s)" as employed in the present invention denotes the amines of formula:

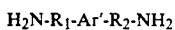

$H_2N\text{-}R_1\text{-}Ar'\text{-}R_2\text{-}NH_2$ in which:

$R_1$ and $R_2$, which are identical or different, are linear or branched $C_1$–$C_6$ hydrocarbon residues;

Ar' is a divalent aromatic radical which has the same meaning as Ar, mentioned above, it being possible furthermore for the said radical Ar' to be substituted according to any configuration, similarly to the above-mentioned group A-r.

Mixtures of aromatic-aliphatic diamines are also envisaged in the present invention. By way of example there may be mentioned meta-xylylenediamine (in the case of which Ar'=m-phenyl, $R_1 = R_2 = =CH_2=$) The saturated derivatives or those containing an aromatic-aliphatic structure in their carbon chain are also envisaged in the present invention. 1,3-Bisaminomethylcyclohexane and 1,3-diaminomethylnorbornane may be mentioned by way of example. Mixtures of aliphatic and/or cycloaliphatic and/or aromatic aliphatic diamine(s), especially of isomers, are also envisaged in the present invention.

The proportion of units (c) which react during stage (i) is between 10 and 90% by weight. Advantageously, from 25 to 75% by weight, preferably 40 to 60% by weight, of units (c) are made to react during stage (i).

Stage (ii) can be implemented as one substage or alternatively as at least two substages. Thus, the unit (c) can be introduced in 1, 2, 3, ... n steps (substages) or more, in identical or different variable proportions in the case of each introduction.

During stage (i) the units (a) and (b) may be premixed before reaction with part of the units (c) or the units (a) (or (b)) and part of the units (c) may be premixed before reaction with the units (b) (or (a)).

According to an embodiment of the present invention the stages (i) and (ii) of the process are performed at a temperature of 250 to 350° C., preferably 270 to 320° C. The temperature of stage (ii) is preferably higher than that of stage (i) by a value of between 15 and 50° C.

According to another embodiment of the present invention, stages (i) and (ii) are performed under an inert atmosphere and at a pressure which is higher than atmospheric pressure, preferably between 5 and 30 bars inclusive. The terms "temperature/pressure of stage (ii)" means the temperatures/pressures of the substages, which are identical or different, when stage (ii) comprises the said substages. At the end of stage (i) the pressure is preferably brought to a value of between 5 and 0.5 bar, preferably between 1.5 and 0.5 bar, during the introduction of the remainder or part of the remainder of the units (c).

According to an embodiment of the present invention the pressure during stage (ii) is lower than that of stage (i) by a value of between 1 and 15 bar.

According to another embodiment an increase in temperature of 15 to 50° C. is performed during stage (ii) while the pressure is concurrently decreased preferably as far as approximately atmospheric pressure.

According to yet another embodiment of the present invention, stages (i) and (ii) are performed under an inert atmosphere and at a pressure which is lower than or equal to atmospheric pressure, preferably between 0.1 and 1 bar inclusive.

The reaction time is between 30 min and 10 h inclusive, and depends on the temperature. The higher the reaction temperature, the shorter the reaction time. In all cases the reaction time must be sufficient to ensure that the reaction has taken place quantitatively.

According to a preferred embodiment, the oligomer produced in stage (i) is isolated before reaction during stage (ii). The term "isolated" means any appreciable change in the operating conditions between stages (i) and (ii). In particular, the oligomer can be taken out of the reactor for the purpose of analysis or transferred to a second reactor where the second reaction stage is performed. A depressurisation can also be applied at the end of stage (i) before the introduction of the diamine. Thus, the pressure can be decreased, for example, from 15 bar as far as vacuum, the remainder of the diamine is introduced and the pressure increases again as a result of the formation of water due to the reaction.

Stage (ii) can also be applied partially: a "prepolymer" in which the degree of conversion of the reaction is between 0.4 and 0.99 is taken out of the reactor. This prepolymer can be taken up again directly or with an intermediate storage in solid form (for example as granulate), in order to perform the end of the polycondensation. This operation is called a viscosity recovery. Stage (ii) can therefore include a viscosity recovery.

This viscosity recovery can be performed in a reactor of extruder type at atmospheric pressure or under vacuum. In the case of crystalline or semicrystalline copolyamides this viscosity recovery can also be performed in solid phase, at a temperature between the glass transition temperature Tg and the melting temperature. It is conventionally a temperature approximately 100° C. above the Tg. The heating can be provided by a gas or heat transfer fluid, such as nitrogen, steam or inert liquids such as some hydrocarbons.

The process according to the present invention can be carried out in any reactor conventionally employed in polymerization, such as reactors with anchor or band stirrers. However, stage (ii) can also be carried out in a horizontal reactor, more commonly called a "finisher" by a person skilled in the art. These finishers can be equipped with devices for applying vacuum, for introducing a reactant (addition of diamine), which may take place in stages or otherwise, and can operate over a wide temperature range.

The process can be catalyzed by known polyamidification catalysts such as phosphoric and hypophosphorous acid, in concentrations of the order of 0.001 to 0.2% by weight.

The proportions of units (a), (b) and (c) as units of the polymer obtained can vary within wide limits, the sum of these proportions remaining equal to 100%. Nevertheless, within the scope of the present invention the process which is envisaged is characterized in that the weight proportion of unit (a) is between 5 and 95%, preferably 10 and 90%, inclusive and in that the molar ratio (b)/(c) is between 1.1/1 and 1/1.1 inclusive.

The present process makes it possible to obtain polyamides of very variable properties. They can be amorphous or semicrystalline, of low or high Tg, and the like. The aromatic diacid unit is preferably terephthalic and/or isophthalic acid.

According to an embodiment of the present invention the diamine unit (c) is an aliphatic diamine, preferably HMDA.

According to another embodiment of the present invention the diamine unit (c) is a cycloaliphatic diamine, preferably BACM and/or BMACM. The aliphatic unit (a) is preferably a unit 12 and/or 11.

The present invention is not limited to this process and its subject is also the polyamides obtained with the aid of this process.

Besides the remainder of diamine, usual additives to polyamides may be added to these polymers at the end of the process or during stage (ii), such as: light and/or heat stabilizers, colorants, optical brighteners, plasticizers, demoulding agents, flameretardant agents, usual fillers such as talc, glass fibers, pigments, metal oxides, arylamide metals and aromatic polyesters.

Other objectives and advantages of the present invention will appear on reading the following examples which are given without any limitation being implied.

OPERATING PROCEDURE IN THE FOLLOWING EXAMPLES

A 5-1 steel reactor equipped with an anchor stirrer and a stock temperature probe is employed in the laboratory. The progress of the reaction is followed by measuring the torque transmitted to the stirrer and the rise in the viscosity of the polymer can be evaluated in this manner. The polymer is taken out of the reactor when a torque value of approximately 0.6–0.8 N/m is reached in the case of a speed of 25 rev/min. The removal of the polymer is performed at a nitrogen pressure of 1 to 2 bar through a bottom valve heated to 280–300° C., situated under the reactor. The polymer is recovered in the form of a lace which is quench-cooled by passing through a pan containing water.

EXAMPLE 1

(comparative, autogenous pressure)

591 g of lauryllactam L12, 415.35 g of terephthalic acid (T) and 299.51 g of HMDA are charged into a steel reactor equipped with an anchor stirrer. The reactor is closed again and then subjected to three purges with nitrogen at 5 bar in order to remove the residual oxygen. The stock temperature is raised from room temperature to 280° C. over 120 min. The stirring is switched on at 50 rev/min as soon as the mixture is stirrable (after heating for 10 min). When 260° C. is reached a pressure rise in the reactor is observed, which corresponds to the beginning of the polycondensation (formation of water); this pressure reaches 26 bar when the stock reaches 280° C. The reaction mass is then kept at 280° C. for 210 min under autogenous pressure which stabilizes at 24.5 bar. No change in torque is observed up to this stage. Relief of the reactor pressure is then begun while the stock temperature is being increased to 290° C, this operation being carried out progressively over 15 min. During this period an increase in torque is observed, which changes from 0.01 to 0.14 N/m at 50 rev/min during this pressure relief. The reaction is then maintained (5-min) under a gentle stream of nitrogen, the torque then increases rapidly to reach 0.9 N/m; the stirring is then decreased to 25 rev/min at a torque equal to 0.6 N/m. This torque then increase very rapidly. The stirring is stopped to take out the final polymer, consisting of 55 mol % of unit L12 and 45 mol% of unit 6,T.

Only about a hundred grams of polymer can be successfully removed; this appears to be partly crosslinked: a rubbery appearance can be observed at the exit.

DSC analysis of this polymer shows that the melting point is 240° C. and the glass transition temperature is 77.6° C.

The polymer obtained is no longer soluble in benzyl alcohol for measuring inherent viscosity.

EXAMPLE 2

(comparative, 10 bar constant pressure)

591 g of lauryllactam L12, 415.35 g of terephthalic acid and 299.51 g of HMDA are charged into a steel reactor equipped with an anchor stirrer. The reactor is closed again and then subjected to three purges with nitrogen at 5 bar in order to remove the residual oxygen. The stock temperature is raised from room temperature to 280° C. over 120 min, the stirring is switched on at 50 rev/min as soon as the mixture is stirrable (after 10 min of heating). During this heating period the increasing pressure in the reactor is watched and limited to 10 bar by being slightly relieved when this pressure becomes higher. The reaction is then maintained at 280° C. at 10 bar for 210 min. No change in the torque is observed up to this stage. A relief of the reactor pressure is then begun while the stock temperature is being raised to 300° C.; this operation is carried out progressively over 25 min. During this period an increase in the torque is observed, which changes from 0.11 to 0.26 N/m at 50 rev/min during this pressure relief. The reaction is then maintained (5 min) under a gentle stream of nitrogen; the stirring is then decreased to 25 rev/min. In the course of 40 min the torque has risen to 1.1 N/m at 25 rev/min; the polymer is then taken out of the reactor.

The polymer obtained has an inherent viscosity of 1.19, a melting temperature of 275° C. and a glassy temperature of 72° C.

Only 400 g of polymer can be recovered from the reactor.

EXAMPLE 3

The operation is carried out in two stages: synthesis of a diacid oligomer by reaction of all of the lactam or aminoacid component(s) with all of the diacid component(s) and only approximately half of the diamine component(s).

First stage:

The reactor is charged with 591 g (3 moles) of lauryllactam, 415.35 g (2.49 moles) of terephthalic acid and 173 g of HMDA (1.49 moles), that is 60% of the diamine needed to form the polymer. The reactor is closed and is then purged with nitrogen. The stock temperature is then raised to 280° C. over 120 min (reactor closed); the stirring is set at 50 rev/min. When 227° C. is reached, a pressure of 9 bar is observed in the reactor; at 280° C. this pressure stabilizes at 16 bar. 280° C. is maintained for 160 min and a progressive pressure relief to 5 bar is then performed (10 min). The reaction mixture is allowed to cool to 200° C.; the oligomer is then removed from the reactor into water.

An analysis of the acidic functional groups is performed (1.55 milliequivalents/g) and an Mn of 1290 is found for this diacid oligomer (in theory Mn 1126), the content of NH2 functional group is 0.1. The measured residual lauryllactam L12 content is 0.18%, the residual terephthalic acid content is 1.2% (on a mass basis).

Second stage:

116.2 g of HMDA (1 mole), that is the remainder of the diamine not introduced in the first stage, are added to the reactor, which contains 1290 g (1 mole) of an oligomer of Mn 1290 synthesized according to the operating method described above. The reactor is closed and then purged with nitrogen. The stock temperature is raised progressively to 280° C. over 120 min with stirring at 50 rev/min. A pressure of 9 bar is then obtained in the reactor. The temperature is then maintained at 280° C. for 30 min and a progressive pressure relief from 9 bar to atmospheric pressure is then performed while the stock temperature is being raised to 300° C. (30 min period). After this pressure relief the reactor is kept under nitrogen; the torque is then 0.1 N/m at 50 rev/min. The stirring rate is lowered to 25 rev/min and the stock temperature raised to 310° C. (30 min); at the end of these 30 min the torque is 0.32 N/m at 25 rev/min and rises steadily. The torque reaches the value of 1.1 after a further 45 min at 310° C.; at this level the polymer is taken out of the reactor.

1150 g of a polymer are thus recovered. The melting point of this polymer is 277° C. and the glass transition temperature 72° C.; its inherent viscosity is 1.12.

EXAMPLE 4

An autoclave is charged with 5.94 kg of lactam 12 (30.15 moles), 4.16 kg of terephthalic acid (24.9 moles) and 1.49 kg of HMDA (97% purity) (12.5 moles, that is 50% of the stoichiometry). The closed reactor is heated to 280° C. and then maintained at this temperature for 90 min with stirring set at 30 rev/min; the pressure in the reactor becomes steady at 17 bar. After this hold at 280° C. an isothermal (280° C.) reactor pressure relief is performed to a pressure of 0.5 bar; this pressure relief is performed progressively over 60 min. The remainder of the diamine is then introduced into the reactor, that is 1.49 kg of HMDA. The pressure in the reactor then rises again to stabilize at 15 bar at 280° C. This operation (introduction of the diamine and stabilization of the reactor at 280° C., 15 bar) takes 50 min. The reaction mixture is again kept at 280° C., 15 bar for 90 min. A pressure relief is then performed at the same time as an increase in the stock temperature; the change is then from 280° C. to 317° C. and from 15 bar to atmospheric pressure, progressively over 65 min. The stirrer torque rises and the polymer is taken out of the reactor 6 min after the end of this pressure relief.

The polymer obtained has a melting temperature of 277° C. and an inherent viscosity of 1.2. Its melt flow index is 4.1 g/10 min at 300° C./2.16 kg (with a 2.095 mm diameter die).

EXAMPLE 5

An autoclave is charged with 11.05 kg of lactam 12 (51.4 moles), 5.83 kg of terephthalic acid (35.1 moles), 1.946 kg of isophthalic acid (11.7 moles) and 5.58 kg of diamine BMACM (23.4 moles, that is 50% of the stoichiometry). The closed reactor is heated to 280° C. and then maintained at this temperature for 90 min with stirring set at 50 rev/min; the pressure in the reactor stabilizes at 14 bar. After this hold at 280° C. an isothermal (280° C.) reactor pressure relief is performed to a pressure of 0 bar (relative); this pressure relief is performed progressively over 60 min. The remainder of the diamine is then introduced into the reactor, that is 5.58 kg of BMACM. The pressure in the reactor then rises again to stabilize at 14 bar at 270° C. This operation (introduction of the diamine and stabilization of the reactor at 270° C., 14 bar) takes 60 min. The reaction mixture is again kept at 270° C., 14 bar for 90 min. A pressure relief is then performed at the same time as an increase in the stock temperature; the change is from 270° C. to 288° C. and from 14 bar to atmospheric pressure, progressively over 60 min. The stirrer torque rises and the polymer is taken out of the reactor 50 min after the end of this pressure relief. 24.7 kg of polymer are recovered.

The copolyamide obtained is transparent and amorphous. It has a glass transition temperature of 160° C. and an inherent viscosity of 1.22.

EXAMPLE 6 (comparison)

In a glass reactor, equipped with a mechanical stirring and under nitrogen atmosphere flushing (P=1 bar), are charged: 15.3 g of 6-amino-hexanoic acid, 20.1 g of terephthalic acid and 14.75 g of HMDA (in excess of about 3%). The reactor is placed in a heating bath maintained at 240° C. After 5 minutes, the temperature of the bath is raised to 290° C., over a period of 50 minutes. At this temperature (290° C.), the reaction medium is pasty, heterogeneous and opaque. The temperature is then raised to 320° C. over 40 minutes. No changes is noticeable; particularly, the viscosity of the medium is raising only weakly, the medium is weakly homogeneous, unfusable material can be noticed in the reaction medium. The reaction is stopped. One obtains a product showing high brittleness and very low inherent viscosity of 0.54.

EXAMPLE 7

The foregoing example is repeated with the same quantities, but the adding of HMDA is carried out in two steps.

In the reactor are charged 15.3 g of amino-6-hexanoic acid, 20.1 g of terephthalic acid and 7.3 g of HMDA (50% of the quantity of example 6). The reactor is placed in a heating bath maintained at 240° C. After 5 minutes, the temperature of the bath is raised to 290° C. over a period of 20 minutes. The reaction medium is thus perfectly melt (with a low viscosity). 7.35 g of solid HMDA (remaining portion) are then added to the mixture, and the temperature of the bath is raised to 320° C. over a period of 50 minutes. During this period, one can notice that the medium remains homogeneous and transparent (no unfused material), further its inherent viscosity is raised very quickly. The reaction is stopped at 320° C. A polymer is obtained that shows strength and an inherent viscosity of 1.30. The DSC analysis shows a melt temperature of 295° C. and a glass transition temperature of 103° C.

EXAMPLE 8

The operating conditions of example 7 are repeated. 6.7 g of amino-6-hexanoic acid, 18.6 g of terephthalic acid, 6.8 g of isophthalic acid and 18.71 g of HMDA are charged in the reactor. The adding of HMDA is performed in a way similar to Example 7, in two parts of 9.36 g and 9.35 g.

A polymer is obtained, which shows an inherent viscosity of 1.10, a melt temperature of 302° C. and a glass transition temperature of 115° C.

EXAMPLE 9

4.1 kg of lactam 12, 4.16 kg of terephthalic acid and 2.0 kg of HMDA (corresponding to 68% of the theory) are charged into an autoclaved reactor. The reactor is closed and the temperature is raised to 280° C., and maintained at said value for a period of 90 minutes (stirring: 30 rpm). The pressure sets to 24 bar into the reactor. Thereafter the reactor is submitted to a pressure relief to 1 bar, over a period of 60 minutes. Then is charged 0.86 kg of HMDA (i.e. an overall sum of 68+29=97% of the theory). The pressure in the reactor then increases to stabilize at about 7 bar. The reaction mixture is maintained at 280° C. for a period of 90 minutes. Then, an expansion and a raise in temperature are carried out simultaneously, in order to reach 320° C. and 1 bar, over a period of 65 minutes. The product, which is deficient in amine group (97% of the theoritical HMDA) is collected, cooled down and grinded (inherent viscosity of 0.60).

5 kg of this grinded product are blended at a temperature of 80° C., with 0.10 kg of HMDA (i.e. the 3% left and a stoechiometric excess of 3% of functions NH2/COOH). The thus-obtained powder is processed in a ZSK-30 extruder, having a feed temperature of 320° C. A polymer is thus obtained, said polymer having an inherent viscosity of 0.90, a melt temperature of 295° C., and a glass transition temperature of 85° C.

While the invention has been described in connection with a preferred embodiment, it is not intended to limit the scope of the invention to the particular form set forth, but on the contrary, it is intended to cover such alternatives, modifications, and equivalents as may be included as defined by the appended claims.

What is claimed is:

1. A process for the manufacture of polyamides consisting of the following reactants:
    (a) lactam(s), corresponding amino acid(s) or the substantially stoichiometric combination of one or more aliphatic diamine(s) and of one or more dicarboxylic aliphatic acid(s), or a mixture thereof,
    (b) aromatic diacid(s) HOOC-Ar-COOH, where Ar is a divalent aromatic radical, and (c) cycloaliphatic, aliphatic, aromatic-aliphatic diamine(s) or a mixture thereof comprising the steps of:
        (i) reacting 10 to 90% by weight of the aliphatic, cycloaliphatic, aromatic-aliphatic diamine or a mixture thereof with the lactam, corresponding amino acid or the substantially stoichiometric combination of one or more aliphatic diamine(s) and of one or more dicarboxylic aliphatic acid(s) of a mixture thereof and with the aromatic diacid reactants, to produce a polyamide oligomer; and
        (ii) reacting the remainder of the aliphatic, cycloaliphatic, aromatic-aliphatic diamine(s) or a mixture therefore with the oligomer produced in stage (i) in one or more subsequent stages.

2. The process according to claim 1, characterized in that from 25 to 75% by weight, of the reactants (c) are reacted during step (i).

3. The process according to claim 1, wherein step (ii) comprises reacting in one subsequent stage(s).

4. The process according to claim 1, wherein step (ii) comprises reacting in at least two subsequent stages.

5. The process according to claim 1, characterized in that reacting temperature during steps (i) and (ii) is between 250 and 350° C.

6. The process according to claim 5, characterized in that the temperature of step (ii) is higher than that of step (i) by a value between 15 and 50° C. inclusive.

7. The process according to claim 1, wherein steps (i) and (ii) comprises reacting under inert atmosphere and at a pressure which is higher than atmospheric pressure.

8. The process according to claim 7, wherein in that at the end of step (i) the pressure is adjusted to a value between 5 and 0.5 bar inclusive during the introduction of the remainder or part of the remainder of the reactants (c).

9. The, process according to claim 7, wherein the pressure during step (ii) is lower than that of step (i) by a value of between 1 and 15 bar inclusive.

10. The process according to claim 9, wherein during stage (ii) the temperature is increased from 15 to 50° C. while the pressure is concurrently decreased.

11. The process according to claim 1, wherein steps (i) and (ii) comprises reacting under inert atmosphere and at a pressure which is lower than or equal to atmospheric pressure.

12. The process according to claim 1, wherein the oligomer produced in step (i) is isolated before reaction during step (ii).

13. The process according to claim 1, wherein step (ii) comprises a viscosity recovery.

14. The process according to claim 1, wherein the weight proportion of unit (a) is between 5 and 95% inclusive, and wherein the molar ratio (b)/(c) is between 1.1/1 and 1/1.1 inclusive.

15. The process according to claim 1, wherein the aromatic diacid unit is terephathalic acid isophthalic acid or a mixture thereof.

16. The process according to claim 1, wherein the diamine (c) is an aliphatic diamine.

17. The process according to claim 1, wherein the diamine (c) is a cycloaliphatic diamine.

18. The process according to claim 1, wherein the aliphatic reactant (a) is 11-aminoundecanoic acid, 12-aminododecanoic acid, or a mixture thereof.

19. The process according to claim 2 wherein from 40 to 60% by weight of the reactants (c) are reacted during step (i).

* * * * *